United States Patent
Wang et al.

(10) Patent No.: US 9,501,227 B2
(45) Date of Patent: Nov. 22, 2016

(54) MEMORY CONTROLLER FOR HETEROGENEOUS COMPUTER

(71) Applicant: Wisconsin Alumni Research Foundation, Madison, WI (US)

(72) Inventors: Hao Wang, Madison, WI (US); Nam Sung Kim, Middleton, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 166 days.

(21) Appl. No.: 14/465,126

(22) Filed: Aug. 21, 2014

(65) Prior Publication Data

US 2016/0054932 A1 Feb. 25, 2016

(51) Int. Cl.
*G06F 12/12* (2016.01)
*G06F 3/06* (2006.01)

(52) U.S. Cl.
CPC .......... *G06F 3/0611* (2013.01); *G06F 3/0659* (2013.01); *G06F 3/0683* (2013.01)

(58) Field of Classification Search
CPC ..... G06F 3/0611; G06F 13/18; G06F 3/0659
USPC ........................................... 711/151
See application file for complete search history.

(56) References Cited

PUBLICATIONS

Ausavarungnirun et al.; Rachata Ausavarungnirun, Kevin Kai-Wei Chang, Lavanya Subramanian, Gabriel H. Loh, and Onur Mutlu, "Staged memory scheduling: achieving high performance and scalability in heterogeneous systems," in ISCA-39, 2012.
Jeong et al.; Min Kyu Jeong, Mattan Erez, Chander Sudanthi, and Nigel Paver, "A QoS-aware memory controller for dynamically balancing GPU and CPU bandwidth use in an MPSoC," in DAC-49, 2012.

*Primary Examiner* — Jae Yu
(74) *Attorney, Agent, or Firm* — Boyle Fredrickson, S.C.

(57) ABSTRACT

A memory controller for heterogeneous computer processors dynamically adjusts access priorities by the different processors to maximize performance in the execution of a single parallel application program on both processor architectures. In one embodiment, the memory controller predicts sequential memory accesses by the processor having higher memory latency or fewer access requests to lockout the other processor during those sequences for improved implementation of the intended prioritization.

14 Claims, 3 Drawing Sheets

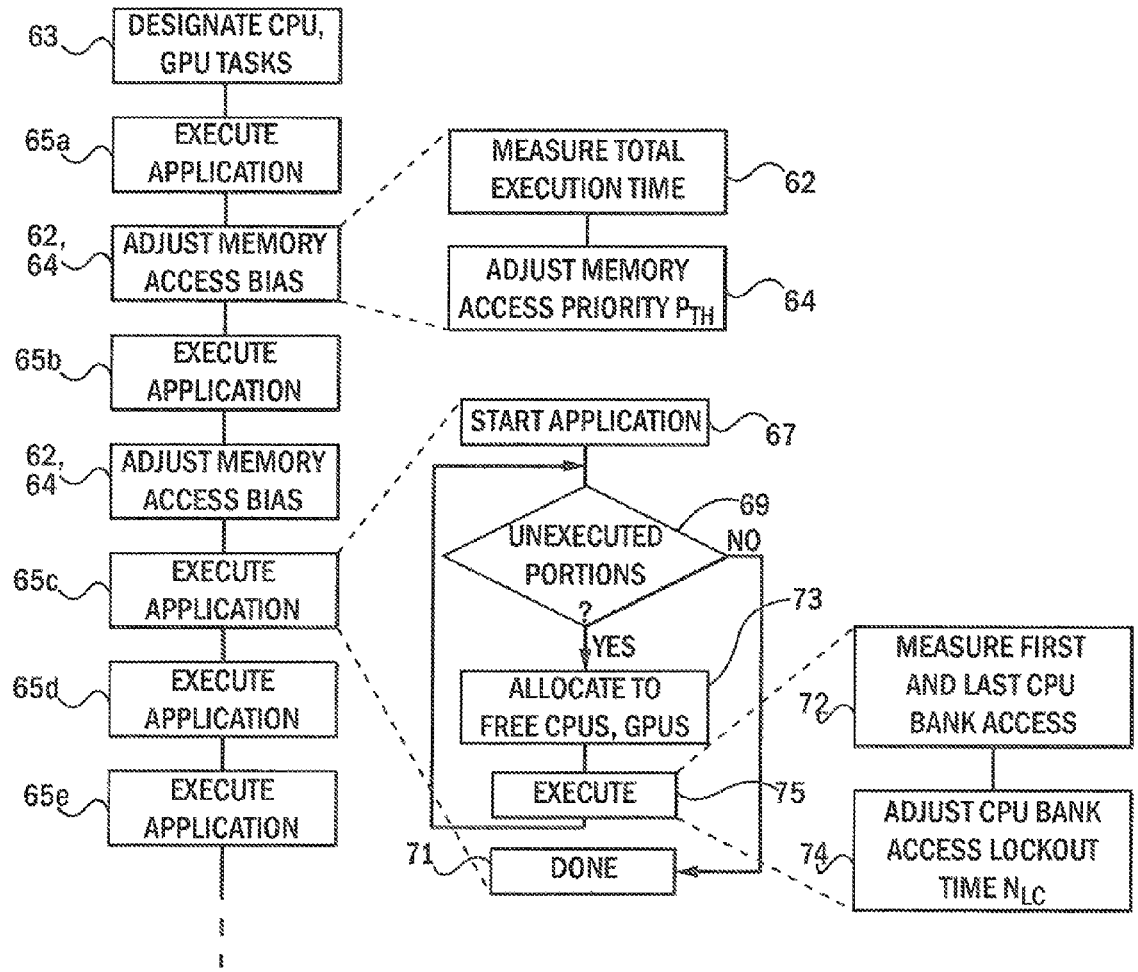
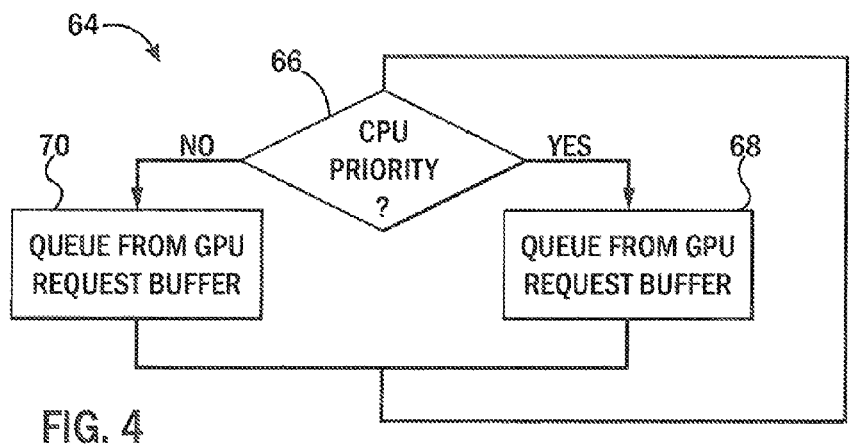
FIG. 3
FIG. 4

MEMORY CONTROLLER FOR HETEROGENEOUS COMPUTER

STATEMENT REGARDING FEDERALLY SPONSORED RESEARCH OR DEVELOPMENT

This invention was made with government support under 1217102 awarded by the National Science Foundation. The government has certain rights in the invention.

CROSS REFERENCE TO RELATED APPLICATION

Not Applicable

BACKGROUND OF THE INVENTION

The present invention relates to heterogeneous computer architectures employing multiple processor types (for example, CPUs and GPUs) and, in particular, to a memory controller providing improved access to common memory when a single parallel application is divided among heterogeneous processors.

Modern computer systems may provide heterogeneous processor architectures, for example, employing one or more conventional computer processing units (CPUs) operating in tandem with specialized graphical processing units (GPUs), the latter tailored to a high-speed streaming processing. Such systems can be performance limited by the speed of off-chip memory access.

One method of improving the speed of off-chip memory access in such systems is to provide access priority to CPU cores. This priority reflects a general understanding that the CPU cores represent a relatively small proportion of memory accesses (minimizing their overall impact on GPU memory accesses) and that CPU cores are less able to tolerate long memory access latency. In contrast GPUs can offset long memory access latency by implementing a large number of hardware threads.

Deciding how to prioritize memory access for one processor type in a heterogeneous processor architecture is difficult because of the unknown relative importance of each task with respect to system performance. Accordingly such systems rely heavily on preserving "fairness" in the allocation; that is, priority systems in which each processor type is guaranteed a given minimum amount of memory access.

SUMMARY OF THE INVENTION

The present inventors have recognized that current priority allocation systems for memory requests in heterogeneous processor systems are suboptimal for an important class of problems where the system executes a single parallel application using both the CPU and the GPU. In this case, the system performance can be evaluated in view of the measured completion of the entire application and fairness may not be a primary consideration. Accordingly, the present invention provides a memory access control system that measures the execution time of the single parallel application running on the different processors and operates to minimize the execution time. The priority may be dynamically adjusted during runtime.

In one embodiment, the invention prevents high-priority memory access requests from being blocked behind more frequent but lower priority memory access requests, defeating the intended prioritization. The invention recognizes that high-priority memory access requests may tend to cluster in many important program types and accordingly locks out the lower priority memory access requests for an adjustable lockout period after a first memory request in a cluster is detected. The cluster size may be determined by the address mapping scheme used by the memory controller and the assumption of sequential memory addresses by the program, although the invention is not limited to this approach. The lockout period may be dynamically adjusted during runtime.

Specifically then, at least one embodiment of the invention provides a computer for heterogeneous computing having a first processor having a first architecture and a second processor having a second architecture different from the first architecture. A memory controller communicating memory access requests from the first and second processor to a memory gives changing levels of priority to memory access requests from the first processor according to a multivalue priority value. A priority value adjuster measures execution time of a single parallel application using the first and second processor, which is the longest of execution times of the first processor and the second processor, and adjusts the priority value to minimize this execution time.

It is thus one feature of at least one embodiment of the invention to provide improved execution of single parallel programs in a heterogeneous environment.

The first processor may be at least one general-purpose computer processing unit providing a first instruction set and the second processor may be at least one graphic processing unit providing a second instruction set different from the first instruction set.

It is thus one feature of at least one embodiment of the invention to provide improved memory access in common heterogeneous computers having a CPU and a GPU.

The computer also may include a memory access lockout to lockout memory access requests from the second processor to a portion of the memory for an adjustable lockout period after a memory access request from the first processor to the portion of the memory.

It is thus one feature of at least one embodiment of the invention to prevent a large memory access request rate from the second processor from defeating an attempt to give high priority to memory access requests from the first processor by the sheer number of requests from the second processor. The natural clustering of access requests provides a way of promoting the high-priority memory access requests in the situation.

The lockout period may be a time value.

It is thus one feature of at least one embodiment of the invention to provide a flexible technique of defining a lockout window.

The lockout period adjuster may measure the time interval of successive memory access requests from the first processor to the portion of the memory during execution of the single parallel application and adjust the lockout period according to that measurement.

It is thus one feature of at least one embodiment of the invention to provide a dynamically adjustable lockout that accommodates changing program behavior to promote high-priority memory access requests without unduly delaying low-priority memory access requests.

The lockout period adjuster may combine multiple measures of successive memory access requests to determine the lockout period to be representative of an expected number of successive memory accesses.

It is thus one feature of at least one embodiment of the invention to provide a predictive adjustment of the lockout that is not destabilized to introduce inefficiencies when there is volatility in the clustering of instructions.

The electronic memory may include different independently accessible memory banks and the lockout period may independently control the lockout period for each bank.

It is thus one feature of at least one embodiment of the invention to provide separate lockout control for each bank, reflecting the ability of the banks to independently serve memory requests without conflict.

Either or both of the lockout period adjuster and priority value adjuster may be implemented in part in a program executing on one of the first and second processors.

It is thus one feature of at least one embodiment of the invention to permit the invention to be implemented, at least in portion, on existing hardware or with minor modifications to that hardware.

The computer may include a program allocator allocating portions of the single parallel application between the first and second processor and adjusting the allocation during the execution of the single parallel application to minimize execution time of the single parallel application.

It is thus one feature of at least one embodiment of the invention to provide a system that can complement an existing system for efficiently dividing a single parallel program up among heterogeneous processors. Adjustment of memory access priority works independently of such allocation to fine tune the results of such allocation.

The memory controller may give priority to memory access by the first processor according to the priority value by applying the priority value as a threshold to a random number.

It is thus one feature of at least one embodiment of the invention to provide a simple way of implementing a multivalued priority using a random number generator that can be easily fabricated as part of a hardware controller.

The single parallel application may compute at least one value dependent on the execution of all portions of the single parallel application on the first and second processor.

It is thus one feature of at least one embodiment of the invention to provide a system that works with the division of single application programs among multiple processors as opposed to the division of unrelated parallel tasks among the multiple processors.

These particular features and advantages may apply to only some embodiments falling within the claims and thus do not define the scope of the invention.

BRIEF DESCRIPTION OF THE DRAWINGS

FIG. 3 is a simplified flowchart of the steps implemented by the computer of the present invention under the control of a runtime layer to adjust memory access priorities and lockouts among the first and second processor;

FIG. 4 is a flowchart showing the implementation of a priority value when loading the scheduling buffer.

DETAILED DESCRIPTION OF THE PREFERRED EMBODIMENT

Hardware Structure

Figure 1:
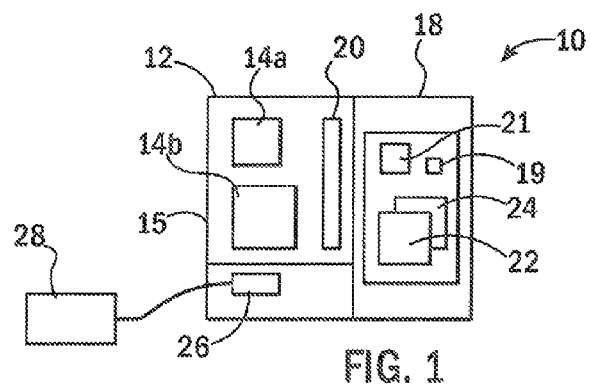
FIG. 1 is a simplified block diagram of a computer providing two different heterogeneous processors communicating with a common memory through a memory controller to jointly execute a single parallel application.

Referring now to FIG. 1, a heterogeneous computer 10 may have one or more general processing units 14a and one or more specialized processing units 14b, these two processing units 14a and 14b each having a different architecture. The two processing units 14a and 14b may be in the form of single-chip heterogeneous processor (SCHP) system 12 invigorating the processor units 14a and 14b on a single integrated circuit substrate 15. The processor system 12 may communicate with an external memory 18, for example, comprised of dynamic random access memory (DRAM). This communication may be managed by a memory controller 20 as will be discussed further below.

The general processing unit 14a, typically termed computer processing unit (CPU), may execute a complex instruction set for general-purpose scalar processing. Examples, of such general processors include those supporting the x86 instruction set architecture capable of executing standard operating systems such as Windows, OSX, Linux and the like.

In contrast, the specialized processing units 14b may execute a specialized instruction set, for example, on stream or vector data. Examples of specialized processing units 14b are graphic processing units (GPUs) or visual processing units (VPUs) operating on video stream data or audio processors operating on audio stream data, each amenable to highly parallelizable processes. Henceforth these devices will be termed GPUs without intending loss of generality.

General processing units 14a normally have less tolerance to latency in acquiring data from external memory than special processing units 14b. Latency is the delay between making a memory request and receiving the requested data and is distinct from the data rate at which data can be obtained from external memory after an initial delay. Because of this characteristic, general processor units 14a will be termed latency-sensitive processors and special processing units 14b will be termed latency-insensitive processors. In addition, the general processing units 14a normally require less memory bandwidth and process fewer memory access requests in a given time than the special processing units 14b which can produce a high rate of memory access requests.

The external memory 18 may include an operating system 21 together with other runtime programs as well as application programs such as a single parallel program 22 and application program data 24. As will be discussed further below, the present invention contemplates that the single parallel program 22 will be parallelizable to be executed concurrently on the general processor units 14a and special processing units 14b. Consequently the memory space holding the single parallel program 22 and application program data 24 would be shared by the general processor units 14a and special processing units 14b requiring a mechanism to provide efficient conflict joint access. A single parallel program may be defined as one which can be divided to be executed as different portions among different processors, but where all of the portions need to be complete for the program to be complete, for example, to provide value output from the program which may be dependent on each of the portions. More generally, the variables of the single parallel program may exhibit interdependency among the portions. The external memory 18 may also include runtime programs 19 working in conjunction with hardware and firmware of the processor system 12 to implement the present invention as described below.

The external memory 18 may be organized in banks, each of which can independently process memory access requests (bank-level parallelism) while individually servicing only one memory access request at a time.

The computer 10 may also provide for one or more interface circuits 26 allowing the computer 10 to communicate with external devices 28 such as network connections, user interfaces (including monitors and keyboards and the like) or other computer peripherals known in the art.

Figure 2:
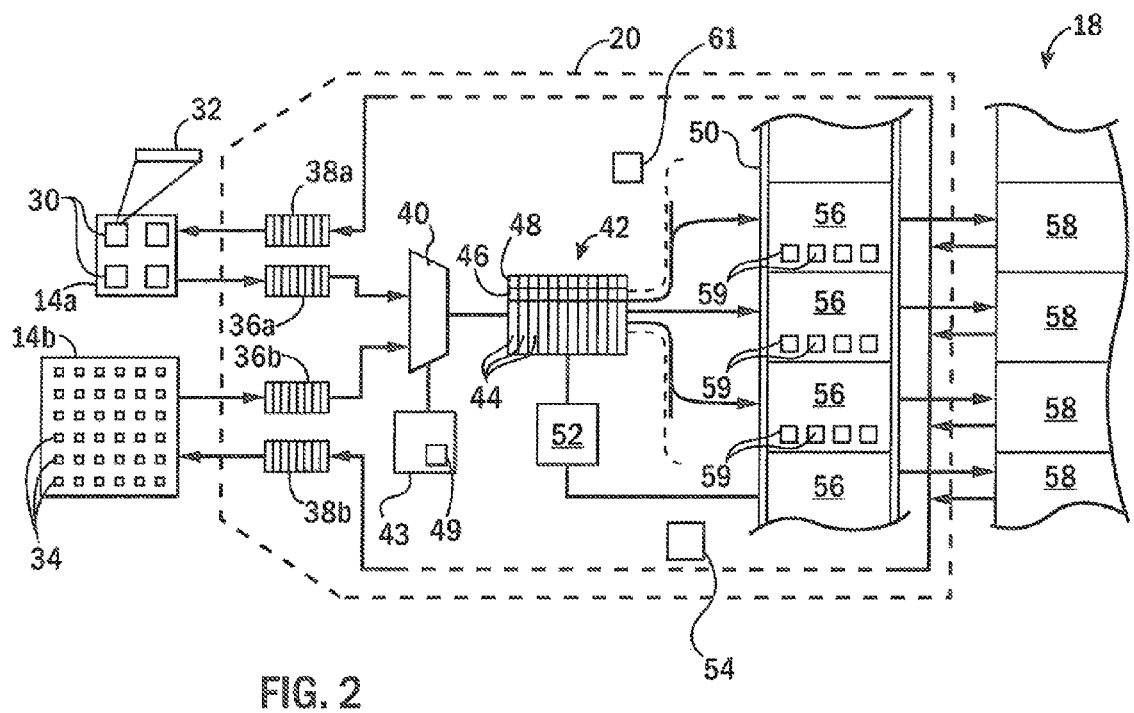
FIG. 2 is a detailed block diagram of the memory controller showing the flow path of memory access requests through input buffers, a scheduling buffer, and a bus arbitration buffer.

Referring now also to FIG. 2, the general processing unit 14a may, for example, be a multicore processor having multiple processor cores 30 each executing a general instruction set with multiple registers and the like and including one or more hardware timers 32 that can measure instruction clock cycles or time. The special processing unit 14b may also be composed of multiple thread execution units 34, typically in much greater number than the cores 30. These thread execution units 34 tend to have a reduced instruction set with respect to the cores 30 and fewer or no unique registers compared to the cores 30.

Both the general processing unit 14a and special processing unit 14b may communicate with the memory controller 20 through memory access input buffers 36a and 36b, respectively, which allow the general processing unit 14a and special processing unit 14b to submit memory access registers defining memory addresses from which data is sought and may receive responsive memory data for those addresses through memory response queues 38a and 38b, respectively.

The outputs of the memory access input buffers 36a and 36b are received by a demultiplexer 40 controlled by an arbitration circuit 43 which selects among the outputs of the memory access input buffers 36a and 36b in first-in, first-out (FIFO) order, particularly requests for enrollment in a scheduling buffer 42 according to a set of rules as will be described below and a priority value 49 ($P_{TH}$) that may change during execution of the single parallel program 22 (shown in FIG. 1) as will be discussed. Generally, an arbitration circuit 43 using the priority value 49 ($P_{TH}$) controls the demultiplexer 40 to select requests from the different memory access input buffers 36a and 36b for populating the scheduling buffer 42.

Within the scheduling buffer 42 each scheduling request 44 is linked to an origin value 46 identifying the source of the scheduling request 44 from either general processing unit 14a or special processing unit 14b. The scheduling buffer 42 also provides for a priority flag 48 indicating particular requests that will receive priority within the normal FIFO order of the scheduling buffer 42. The requests 44 may be held in the order in which they are received so that information about the order in which the scheduling requests 44 were received is preserved.

Requests 44 in the scheduling buffer 42 are submitted to a bus arbitration buffer 50 according to a scheduling circuit 52. The scheduling circuit 52 may implement a general first-row first-come, first-served (FR-FCFS) policy modified as will be described below. As is understood in the art, an FR-FCFS policy serves the first scheduling requests 44 received while providing limited priority to scheduling requests 44 on banks, pages, or row buffers that are currently open and which can be served faster. This policy may set or reset priority flags 48 that may also be set or reset by the present invention allowing for the integration of two overlapping priority rule sets.

The arbitration buffer 50 includes separate buffer elements 56 associated with different banks 58 of the memory 18. As described above, each bank 58 can serve a single request at a time and thus presents independent access delays from a point at which the request to the bank 58 is submitted to the point at which data is retrieved from the bank 58.

A lockout time value 54 ($N_{LC}$) may be dynamically adjusted during execution of the single application program 22 as will be discussed below. Execution statistics and control of memory access will be implemented by a set of lockout timer/counters 59 (designated A, B, C and D) associated with each buffer element 56 of the bus arbitration buffer 50. These these timer/counters will hold data related to historical access to corresponding bank 58 memory 18 by request from general processing unit 14a. In operation, the scheduling circuit 52 generally allocates requests 44 from the scheduling buffer 42 to particular ones of the separate buffer elements 56, depending on the appropriate bank 58 where the requested data is held, and according to data held in the lockout timer/counters 59 and according to the value of $N_{LC}$. The value of the lockout time value 54 ($N_{LC}$) is adjusted dynamically using the data from lockout timer/counters 59 as will be discussed below.

The memory controller 20 may also provide for a random number generator 61, for example, generating a random number within a desired range.

Runtime Operation

I. Program Division

Referring now to FIGS. 1-3, the operating system 21, or one or more runtime services under that operating system, will typically execute on one of the cores 30 of the general processing unit 14a to oversee the execution of the single parallel program 22 on both the general processing unit 14a and special processing unit 14b. In a first step of this process, the single parallel program 22 is divided into portions that should be directed specifically to general processing units 14a and the special processing unit 14b, for example, according to the specialized abilities of the general processing unit 14a and special processing unit 14b, per process block 60. This step may be skipped in cases where the single parallel program 22 is divisible into portions that are equally executable by the special processing unit 14b and the general processing unit 14a. This division, which may occur when the program is being written or during compilation identifies portions of the single parallel program 22 that can be executed separately with minimal interaction with the other portions, provides for paths of that interaction (for example, semaphores or locked variables).

In one embodiment, during an execution, unexecuted portions of the single parallel program 22 are allocated to ones of a pool of general processing units 14a and special processing units 14b as they become available. Specifically at process block 67, the execution may begin and at decision block 69 the portions of the single application program 22 examined to see if they have all been completely executed. If so, the program iteration completes as indicated by process block 71. If the program portions have not all been completed then at process block 73 uncompleted program portions are allocated to free ones of the general processing units 14a or special processing units 14b from a pool according to availability and aptitude for the particular unexecuted portion. Those portions are then executed as indicated by process block 75.

The invention also contemplates that specific portions of the single parallel program 22 may be specifically assigned, for example using a schedule, to particular ones of the general processing units 14a and 14b according to methods known in the art, to preemptively attempt to balance the load among all processing units. Any such balancing may be performed independently of the present invention.

II. Memory Access Priority

After the single parallel program 22 has been allocated to the general processing unit 14a and special processing unit 14b, it may execute one iteration at process block 65a. After this iteration 65a, the time required to complete the execution of each assigned portions of the single parallel program 22 by the general processing unit 14a and special processing unit 14b may be measured. Generally it is anticipated that the single parallel program 22 will be executed multiple times in multiple iterations (65a-65e) and, accordingly, measurement of execution time may simply measure the time at which each execution of one iteration begins and concludes. Alternatively and equivalently a measure may be made of the time it takes for all portions of one iteration to be executed on the given group of the general processing units 14a or special processing units 14b which are last to complete their assigned portions. Timers 32 of the general processor units 14a may be used for this purpose under control of the operating system.

These measurements of process block 62 may be used to determine the priority value 49 ($P_{TH}$) used to control the priority of memory access between the general processing unit 14a and the special processing unit 14b that minimizes the execution time for a portion of the single parallel program 22 having the longest execution time. One way of determining the optimal value of the priority value 49 ($P_{TH}$) is to vary the value of the priority value 49 ($P_{TH}$) over different iterations of execution of the single parallel program 22 and to identify the value of priority value 49 ($P_{TH}$) that produces the shortest execution time of the single parallel program 22. This process can be done occasionally, for example, over the first few iterations only, and can execute a greedy algorithm in which the process stops as soon as minimum execution time is identified (a drop and then rise in execution time).

For example, the priority value 49 ($P_{TH}$) may be defined to vary from 0 to 1 in increments of 0.1. With successive iterations in the execution of the single parallel program 22, the value of priority value 49 ($P_{TH}$) may be increased from zero by steps of 0.1 for each iteration with higher values of priority value 49 ($P_{TH}$) giving greater priority to the general processing unit 14a. At each iteration, the execution time of each of the portions of the single parallel program 22 executing on different processors may be measured to compute a total execution time equal to the longest (maximum) of the execution times of each of the portions. As soon as the total execution time drops in successive iterations, that value of priority value 49 ($P_{TH}$) is used.

This value of priority value 49 ($P_{TH}$) will be the one that roughly equalizes the execution times of the different portions of the single parallel program 22 as allocated among the general processing unit 14a and special processing unit 14b and thus which minimizes execution time of the single parallel program 22.

A current value $P_{TH}$ is then provided to the arbitration circuit 43, as indicated by process block 64, for use as will be described below.

As noted above, it is anticipated that the process of adjusting the memory access priority $P_{TH}$ per process box 62, 64, may be done following only a first, or first few of the iterations 65 and then on a less periodic basis consistent with the expectation that the value of $P_{TH}$ will be essentially constant for giving computer system and application program 22.

Referring now to FIG. 4, process block 64, which may execute concurrently with the other process blocks of FIG. 3, controls the allocation of requests from input buffers 36a and 36b according to the value of $P_{TH}$ as indicated by decision block 66.

In one example, the values of $P_{TH}$ may range from 0 to 1 in 0.1 increments. A decision as to whether to fill the scheduling buffer 42 from memory input buffers 36a associated with general processing unit 14a as indicated by process block 68 or to fill the scheduling buffer 42 from memory input buffers 36b associated with special processing unit 14b per process block 70 will generate a random number using random number generator 61 between zero and one and compare that result against the value $P_{TH}$. If the random number is less than $P_{TH}$, the scheduling buffer 42 is filled per process block 68. This process is then repeated for each subsequent filling of the scheduling buffer 42. It will be understood, in this example, that the higher the value of $P_{TH}$, the greater priority scheduling requests from the general processing unit 14a is provided.

Referring again to FIG. 3 in this way, the priority of memory requests from the general processing unit 14a is adjusted to better equalize the execution speed of the assigned portions of the single parallel program 22 on the general processing unit 14a and special processing unit 14b.

III. Access Lockout

Concurrently or sequentially with process blocks 62 and 64, the process 63 may measure the patterns of requests for each bank 58 of the memory 18 as indicated by process block 72. This measurement attempts to detect patterns of sequential memory accesses by general processing unit 14a of a given bank 58 to prevent those accesses from being interrupted by the more numerous memory access requests 44 by the special processing unit 14b. Accordingly, upon a first memory access request 44 within a time window for a given bank 58 by the general processing unit 14a (after a request from the general processing unit 14a from any other bank 58) process 63 stores a time value (or similar proxy for times such as instruction counter values, access request numbers etc., henceforth collectively termed time values) in the start register 59. Likewise, the last memory access request 44 within the same time window for the given bank 58 by the general processing unit 14a before it makes a request of another bank 58 is stored as a time value in the stop register 59 to provide a general indication of the time window during which a pattern of sequential requests by the general processing unit 14a is historically made for that given bank. The present inventors have identified that a regular pattern of punctuated sequential access of a given bank by the general processing unit 14a is relatively common across a range of parallel programs and further that this sequence of requests be unduly delayed by intervening requests by the special processing unit 14b which typically have a higher request bandwidth. The measurements and data stored by the lockout timer/counters 59 are used to develop a lockout time value 54 ($N_{LC}$) which blocks access requests 44 from the special processing unit 14b during the lockout time value 54 per process block 74.

Generally the lockout time value 54 ($N_{LC}$) may provide for a rolling average of successive measurements made by the start and stop registers 59, for example, by taking an average of the current lockout time value 54 ($N_{LC}$) and the most recently calculated difference between the stop and start registers 59. This averaging process provides improved stability to the value of $N_{LC}$ providing it with better predictive value.

The foregoing process blocks 60, 62, 64, 72, and 74 are shown arranged sequentially for clarity but may be executed in different orders or may execute concurrently as is generally understood in the art.

Figure 5:
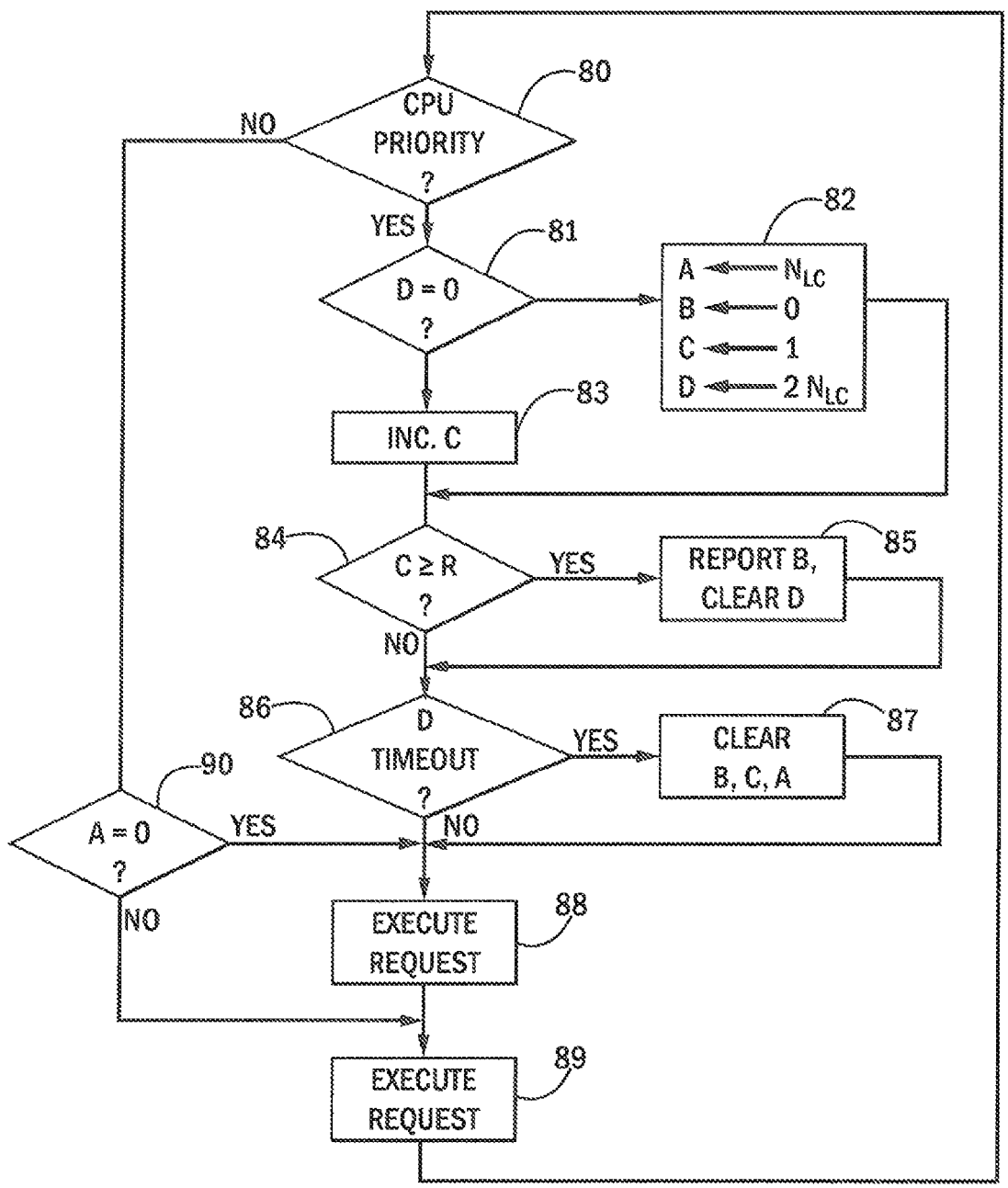
FIG. 5 is a flowchart showing the implementation of a lockout time value when loading of the scheduling buffer.

Referring now to FIGS. 2 and 5, the lockout time value 54 ($N_{LC}$) is used by the scheduling circuit 52. When the scheduling circuit 52 receives a request 44 from the scheduling buffer 42, the scheduling circuit 52 identifies the source of the request as being either the general processing unit 14*a* or special processing unit 14*b*. If the request is from the general processing unit 14*a*, per decision block 80, the scheduling circuit 52 proceeds to decision block 81 to determine if timer D of the lockout timer counters 59 has a value of zero. Timer D is a countdown timer stopping at zero when it has fully counted down. When timer D has a value of zero, it indicates that the request from decision block 80 is a first request for the particular bank 58.

Assuming that this request is a first request and that timer D has a value of zero, then at process block 82, timer A is set with the current lockout value $N_{LC}$. Timer A is also a countdown timer stopping at zero. Timer A will generally indicate whether or not the bank 58 is locked. In addition timer B is set to zero. Timer B is a count up timer. Further, counter C is set to one. Counter C is a count up counter that counts the number of accesses by the general processing unit 14*a* in each cluster. Finally timer D is set to $2N_{LP}$ a value that establishes a window during which a cluster is presumed to fall. The process then proceeds to decision block 84.

If at decision block 81, the value of timer D is not zero, indicating that the recent request is not the first request of a cluster, the program proceeds to process block 83 and counter C is incremented. The process then passes to decision block 84.

At decision block 84, the value of counter C is compared to a predetermined number R being the expected number of memory access requests by the general processing unit 14*a* in a cluster. As noted above, this number may be predetermined by evaluating type of memory address map used indicating the mapping from linear address space to locations in the physical memory devices and assumptions that the single application program 22 will generally access memory sequentially. Thus if the bank bits are put closer to most significant bit, it will be expected that the value of R will be larger and vice versa.

By way of example, consider a simple system having 2 banks, each bank having 2 rows and each row having four columns (blocks). An address for such a memory would be 4 bits long with:

1 bit providing a bank index (B)
1 bit providing a row index (R); and
2 bits providing a column index (C).

In this case, one address mapping might be: RBCC meaning an address, from left to right, where the 1st bit decides the row index, the 2nd bit decides bank index, and the 3rd & 4th bits together decides column index. In this case, the address 1011 points to bank 0, row 1, column 3 (11 in binary).

For this mapping, in a sequential access, we would expect four consecutive requests to the same bank before the requests move to another bank. For example: 0000-0001-0010-0011 all to bank 0, then 0100 to bank 1.

Now consider an alternative address map of: RCBC. In this case, address 1011 points to bank 1, row 1, column 1 (01 in binary). For the same sequential access we would expect 2 consecutive requests to the same bank. For example, 0000-0001 to bank 0, then 0010 to bank 1. In this way, the address mapping can be used to predetermine the value R If at decision block 84 the value of counter C is less than R, it can be assumed that the expected cluster is not complete and the process proceeds to decision block 86. On the other hand if the value of counter C equal to R, it is assumed that the cluster has been completed and the program proceeds to process block 85 where timer B is stopped and saved for calculating or updating $N_{LP}$, and the value of timer D is set to zero indicating that the cluster is complete.

At decision block 86 the value of timer D is evaluated to see if it has timed out (equals zero) which will always be the case following process block 85 and which may sometimes be the case following decision block 84. If so, timer A, B and counter C are set equal to zero or cleared.

In either case following process block 87 or decision block 86, the process proceeds to process block 88 and the access requested is executed. Next at process block 89 the next request is fetched.

If at decision block 80 the request was not from a general processing unit 14*a* but instead from a special processing unit 14*b*, the program proceeds to decision block 80 to see if timer A has reached zero indicating the end of the lockout period.

If so, the request may execute at process block 88 but if not, the request is deferred and the next request obtained at process block 89. The deferral process may simply move the request back one place in the scheduling queue 42 so that the request is again considered promptly after the conclusion of the lockout period.

It will be understood that this process allows uninterrupted runs of successive accesses to a given bank 58 by the general processing unit 14*a* so as to keep such requests from being blocked by more frequent access requests by the special processing unit 14*b*, thus blocking from undoing the intended priority of the request by the general processing unit 14*a*. Generally this process gives priority to the general processing unit 14*a* expected to provide fewer memory requests and/or to be more sensitive to latency.

Certain terminology is used herein for purposes of reference only, and thus is not intended to be limiting. For example, terms such as "upper," "lower," "above," and "below" refer to directions in the drawings to which reference is made. Terms such as "front," "back," "rear," "bottom," "side," "left" and "right" describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first," "second" and other such numerical terms referring to structures do not imply a sequence or order unless clearly indicated by the context. The term "multivalue" as used herein means at least three different values to distinguish from a simple on or off state.

When introducing elements or features of the present disclosure and the exemplary embodiments, the articles "a," "an," "the" and "said" are intended to mean that there are one or more of such elements or features. The terms "comprising," "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

All of the publications described herein including patents and non-patent publications are hereby incorporated herein by reference in their entireties.

We claim:

1. A computer for heterogeneous computing comprising;
a first processor having a first architecture;
a second processor having a second architecture different from the first architecture;
an electronic memory;
a memory controller communicating memory access requests from the first and second processor to the memory, the memory controller giving a changing level of priority to memory access requests from the first processor according to a multivalue priority value; and
a priority value adjuster measuring execution time of portions of a single parallel application on the first and second processor and adjusting the priority value to minimize a longest of the execution times of the portions during execution of the single parallel application.

2. The computer of claim 1 wherein the first processor is at least one general-purpose computer processing unit providing a first instruction set and the second processor is at least one graphic processing unit providing a second instruction set different from the first instruction set.

3. The computer of claim 1 further including a memory access lockout to lock out memory access requests from the second processor to a portion of the memory for a predetermined lockout period after a memory access request from the first processor to the portion of the memory.

4. The computer of claim 3 wherein the first processor has greater sensitivity to memory latency than the second processor.

5. The computer of claim 3 wherein the first processor makes fewer memory access requests than the second processor.

6. The computer of claim 3 wherein the lockout period is a time value.

7. The computer of claim 3 further including a lockout period adjuster measuring successive memory access requests from the first processor to the portion during execution of the single parallel application and adjusting the lockout period according to that measurement.

8. The computer of claim 7 wherein the lockout period adjuster combines multiple measures of successive memory access requests to determine the lockout period to be representative of an expected number of successive memory accesses.

9. The computer of claim 3 wherein the electronic memory includes different banks, and wherein the portion is a given hank and the lockout period adjuster independently controls a lockout period for each bank.

10. The computer of claim 9 wherein the lockout period adjuster is at least in part a program executing on one of the first and second processors.

11. The computer of claim 1 wherein the priority value adjuster is at least in part a program executing on one of the first and second processors.

12. The computer of claim 1 further including a program allocator allocating portions of the single parallel application between the first and second processor and adjusting the allocation during the execution of the single parallel application to minimize execution time of the single parallel application.

13. The computer of claim 1 wherein the memory controller gives priority to memory access by the first processor according to the priority value by applying the priority value as a threshold to a random number.

14. The computer of claim 1 wherein the single parallel application computes at least one value dependent on the execution of all portions of the single parallel application on the first and second processor.

* * * * *